(12) United States Patent
Zhu

(10) Patent No.: US 8,020,880 B2
(45) Date of Patent: Sep. 20, 2011

(54) NO-PINCH STEERING MECHANISM

(75) Inventor: Shenwei Zhu, Chicago, IL (US)

(73) Assignee: Radio Flyer, Inc., Chicago, IL (US)

( * ) Notice: Subject to any disclaimer, the term of this patent is extended or adjusted under 35 U.S.C. 154(b) by 341 days.

(21) Appl. No.: 12/424,912

(22) Filed: Apr. 16, 2009

(65) Prior Publication Data
US 2010/0264625 A1    Oct. 21, 2010

(51) Int. Cl.
*B62B 3/00* (2006.01)
(52) U.S. Cl. .............. 280/47.11; 280/87.01; 280/444
(58) Field of Classification Search .............. 280/47.11, 280/47.34, 47.36, 47.38, 62, 87.01, 87.021, 280/87.03, 87.041, 87.051, 267, 444, 642, 280/647, 650, 651, 655, 655.1, 657, 658, 280/771, 93.5, 93.502, 93.508, 93.51, 93.511, 280/93.513, 93.514
See application file for complete search history.

(56) References Cited

U.S. PATENT DOCUMENTS

| | | | | |
|---|---|---|---|---|
| 678,144 A * | 7/1901 | Thompson | ............. | 280/124.126 |
| 781,238 A * | 1/1905 | Smith | ............. | 280/93.513 |
| 810,679 A * | 1/1906 | Rudert | ............. | 280/47.11 |
| 1,131,254 A | 3/1915 | Longman et al. | | |
| 1,156,023 A * | 10/1915 | Sleffel | ............. | 280/93.51 |
| 1,197,581 A * | 9/1916 | Masury | ............. | 280/124.116 |
| 1,550,049 A * | 8/1925 | Rundle | ............. | 280/87.01 |
| 2,542,433 A * | 2/1951 | Rockman | ............. | 280/87.01 |
| 2,913,250 A * | 11/1959 | La Fever | ............. | 280/87.01 |
| 3,066,945 A * | 12/1962 | Prescott | ............. | 280/47.11 |
| 3,295,622 A * | 1/1967 | Pitchford | ............. | 180/9.22 |
| 3,315,976 A * | 4/1967 | Thiermann | ............. | 280/103 |
| 3,430,975 A * | 3/1969 | Wolf | ............. | 280/103 |
| 3,477,742 A * | 11/1969 | Barrington | ............. | 280/444 |
| 3,695,628 A * | 10/1972 | Fisher | ............. | 280/103 |
| 3,923,320 A * | 12/1975 | Favreau et al. | ............. | 280/103 |
| 4,098,519 A * | 7/1978 | Reid, Jr. | ............. | 280/87.01 |
| 4,192,525 A * | 3/1980 | Clark | ............. | 280/443 |
| 4,222,582 A * | 9/1980 | Tonelli et al. | ............. | 280/87.021 |
| 4,655,467 A * | 4/1987 | Kitzmiller et al. | ............. | 280/444 |
| 5,340,142 A * | 8/1994 | Kuhns | ............. | 280/444 |
| 5,513,940 A * | 5/1996 | Florentin et al. | ............. | 414/458 |
| 5,947,493 A | 9/1999 | Pasin et al. | | |
| 6,079,721 A * | 6/2000 | Williford | ............. | 280/93.51 |
| 6,158,759 A * | 12/2000 | Perry | ............. | 280/444 |
| 6,302,421 B1 * | 10/2001 | Lee | ............. | 280/210 |
| 6,325,403 B1 * | 12/2001 | Brutger | ............. | 280/444 |
| 6,619,680 B2 * | 9/2003 | Platteeuw et al. | ............. | 280/100 |
| 6,722,675 B2 * | 4/2004 | Bidwell | ............. | 280/89 |
| 7,114,732 B1 * | 10/2006 | Ismail | ............. | 280/47.34 |
| 2002/0101046 A1 * | 8/2002 | Potter | ............. | 280/47.34 |
| 2003/0079927 A1 * | 5/2003 | Platteeuw et al. | ............. | 180/245 |
| 2011/0062680 A1 * | 3/2011 | Hellbusch | ............. | 280/442 |

* cited by examiner

*Primary Examiner* — J. Allen Shriver, II
*Assistant Examiner* — Brodie Follman
(74) *Attorney, Agent, or Firm* — R. Blake Johnston, Esq.; DLA Piper LLP (US)

(57) ABSTRACT

A children's vehicle includes a body and a cross member attached to the body. A tongue assembly features a leading portion, a central portion and a trailing portion, with the central portion pivotably connected to the cross member. A handle is pivotally attached to the leading portion of the tongue assembly. A tie rod is pivotally attached to the trailing portion of the tongue assembly. A pair of axle spindles are pivotally attached one each to opposite ends of the cross member. A pair of wheels are rotatably mounted one each on the pair of axle spindles. A pair of generally S-shaped torque arms are connected one each to the axle spindles and pivotally connected one each to opposite ends of the tie rod.

18 Claims, 9 Drawing Sheets

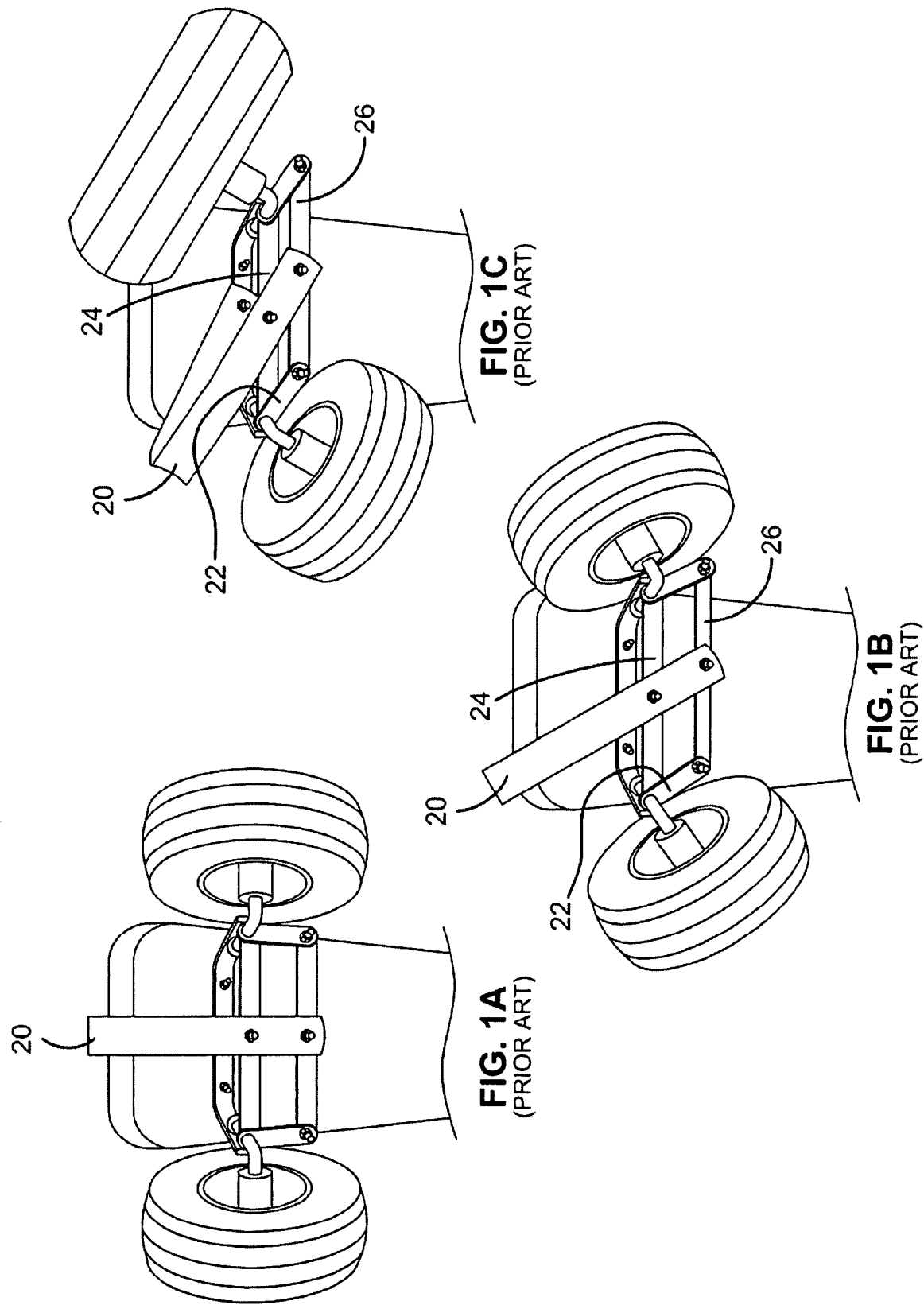

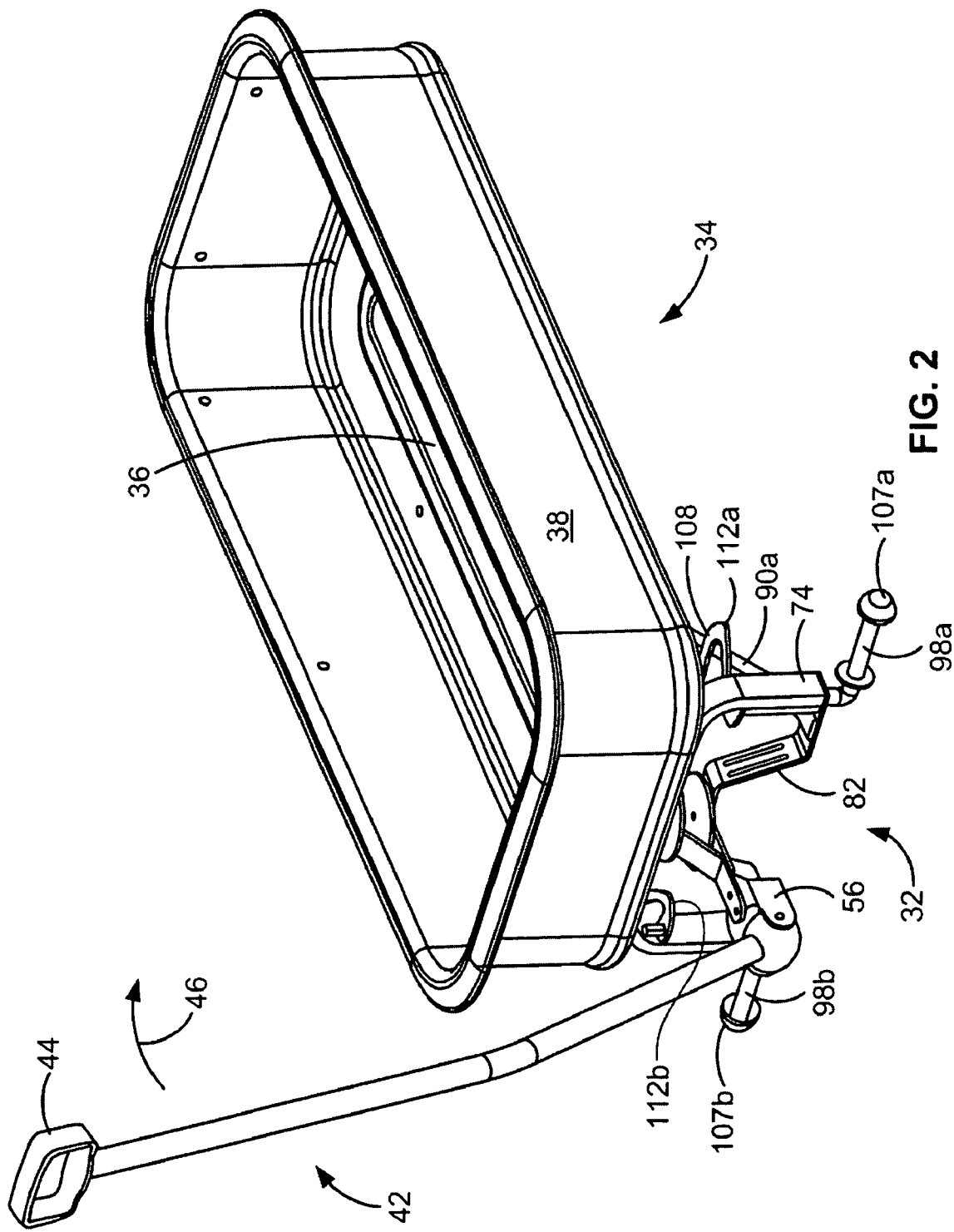

NO-PINCH STEERING MECHANISM

BACKGROUND

The present invention relates generally to children's vehicles and, more particularly, to a steering mechanism for children's vehicles such as wagons.

Children's wagons have long been popular play items. They often feature a body constructed of steel, plastic or wood that includes a floor surrounded by sidewalls so that cargo may be hauled. Alternatively, a child may sit or kneel on the floor of the wagon. A pair of rear wheels are typically mounted to the underside of the rear portion of the wagon floor while a bolster is pivotally mounted in the fashion of a turntable to the underside of the front portion of the wagon floor. A pair of front wheels are mounted to the bolster as is a pivoting handle. The wagon may be pulled by the handle which may also be used to steer the front wheels by pivoting the bolster. The handle may also be rotated back towards the rear of the wagon so that the handle may be accessed by a wagon passenger when the wagon is used "coaster" style.

The bolsters of such wagons, however, may only be pivoted a limited amount to protect against tipping the wagon during turning. As a result, such wagons are typically constructed with a "limited turning" feature, such as the one illustrated in U.S. Pat. No. 4,744,575 to Tonelli. A disadvantage of including this feature is that the wagon has a larger turning radius. This makes the wagon more difficult to maneuver. In addition, such wagons may be difficult to turn, especially on rough surfaces, as each of the front wheels must traverse an arc as the bolster pivots during turning.

Automotive-style steering mechanisms have been employed on children's wagons and address the issues of the wagons of the above paragraph. An example of such a steering mechanism is illustrated in FIGS. 1A through 1C, where the wagon handle is pivotally attached to tongue 20. While such a mechanism functions well when the wagon is traveling generally straight forward, as illustrated in FIG. 1A, a pinching hazard exists when the wagon is turned, as illustrated in FIGS. 1B and 1C. More specifically, as illustrated in FIG. 1B, as the wagon is turned, one of the mechanism torque arms 22 pivots towards cross member 24. In addition, the tie rod 26 moves toward the cross member 24. As illustrated in FIG. 1C, when the wagon makes sharp turns, the torque arm 22 and tie rod 26 actually nearly contact the cross member 24. As a result, a child's fingers, hands or other body parts may become pinched between the torque arm 22 and/or tie rod and the cross member 24 when the mechanism is actuated in the manner illustrated in FIGS. 1B and 1C. A need exists for a steering mechanism for children's wagons that avoids such a "scissor" action and resulting pinching hazard.

BRIEF DESCRIPTION OF THE DRAWINGS

FIGS. 1A-1C are bottom perspective views of a prior art wagon steering mechanism as it is actuated;

FIG. 2 is a perspective view of an embodiment of the steering mechanism of the present invention attached to a wagon body;

DESCRIPTION OF EMBODIMENTS

Figure 3A:
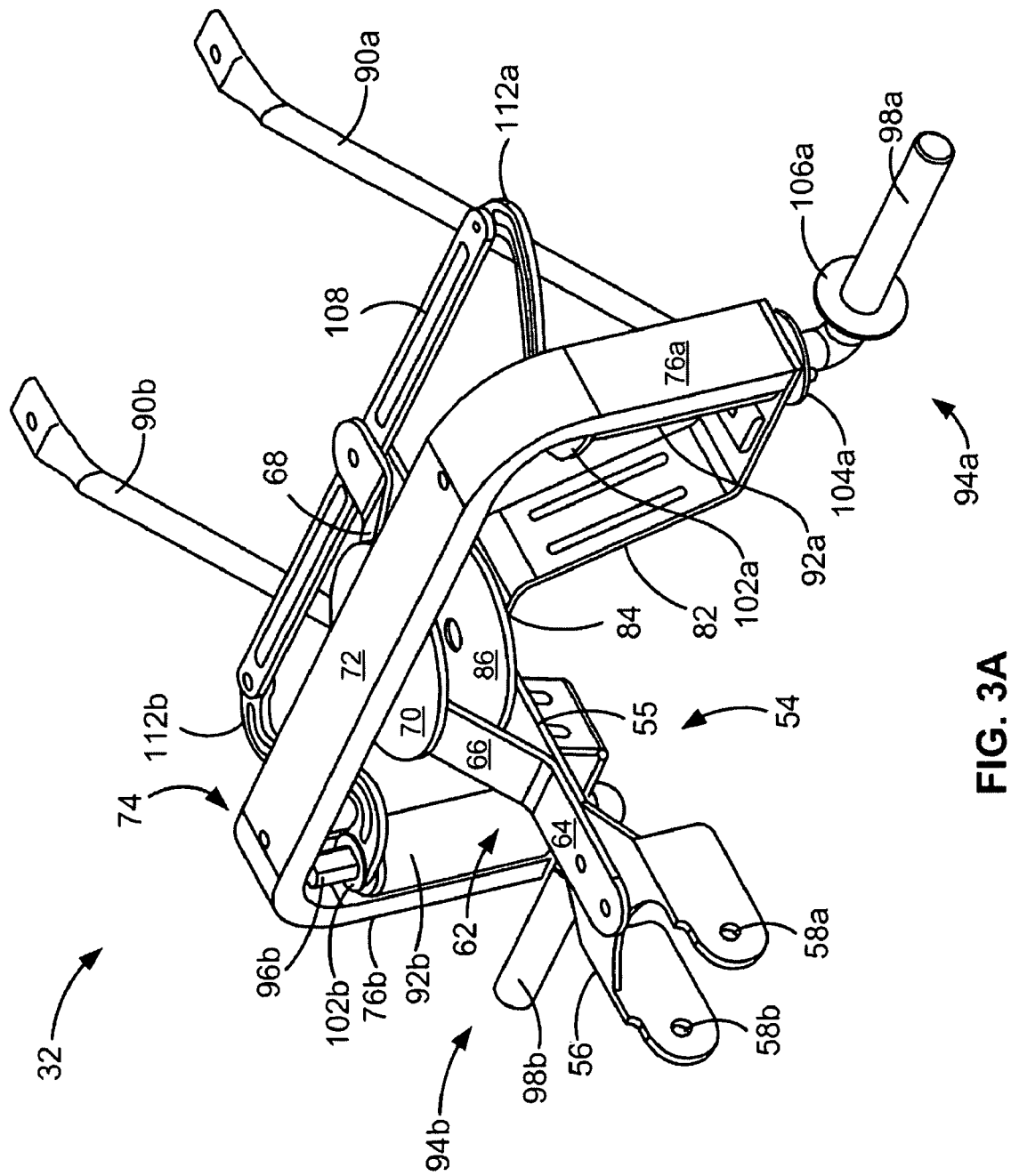
FIGS. 3A-3C are enlarged perspective views of the steering mechanism of FIG. 2 configured to direct the wagon straight, in a maximum right turn and in a maximum left turn, respectively.

While an embodiment of the steering mechanism of the present invention is described below in terms of a children's wagon, it is to be understood that the steering mechanism of the invention may be used on other types of wagons and children's vehicles.

An embodiment of the steering mechanism of the present invention is indicated in general at 32 in FIG. 2 and attached to the bottom of the body, indicated in general at 34, of a children's wagon. The body 34 may be constructed of steel, plastic, wood or any other durable rigid material and preferably features a floor 36 surrounded by a continuous sidewall 38.

A handle, indicated in general at 42 in FIG. 2, is pivotally attached by its bottom end to the steering mechanism 32, as explained in greater detail below, and features a handgrip 44 at the top end. As is known in the art, the handle may pivoted in the direction of arrow 46 from the "pulling" position illustrated in FIG. 2 to a "coaster wagon" position where the handle may be accessed by a child positioned in the wagon. In addition, as will be described in greater detail below, the handle may be pivoted in the opposite direction into a storage position under the wagon body.

Figure 6:
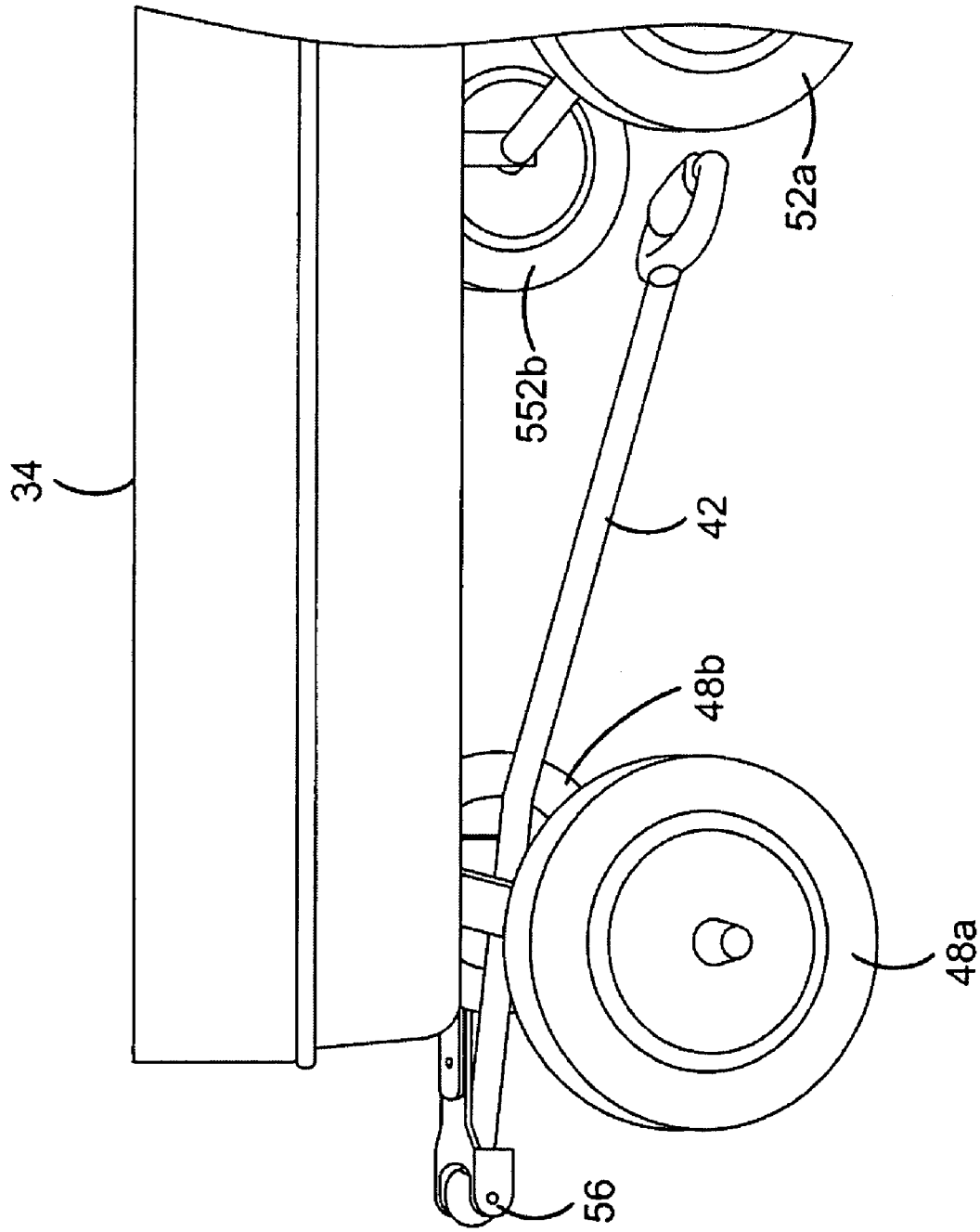
FIG. 6 is a perspective view of a wagon equipped with the steering mechanism of FIGS. 2-5B with the handle in the storage position of FIG. 5B.

As illustrated in FIG. 6, a pair of front wheels 48a and 48b may be attached to the steering mechanism while a pair of rear wheels 52a and 52b may be mounted to the underside of the rear portion of the wagon floor of the wagon body.

With reference to FIG. 3A, the steering mechanism 32 includes a tongue assembly, indicated in general at 54. The tongue assembly includes a lower tongue 55 with a leading end that terminates in clevis 56. The lower tongue 55 and clevis 56 may be manufactured as a single piece or as multiple pieces that are attached together. As illustrated in FIG. 2, the clevis 56 receives the bottom end of the wagon handle 42 in a pivotal fashion via a bolt or screw that passes through openings 58a and 58b (FIG. 3A). An upper tongue, indicated in general at 62 in FIG. 3A, is attached by its leading end portion 64 to the clevis 56.

As illustrated in FIG. 3A, the upper tongue 62 features leading and trailing ramp portions 66 and 68, respectively, that are secured to disk-shaped pinch shield 70. Alternatively, the upper tongue and pinch shield may be formed as a single piece. Pinch shield 70 is pivotally attached to the underside of the central portion 72 of a steering mechanism mount, indicated in general at 74 in FIG. 3A. More specifically, the underside of the central portion 72 features a bore (not shown) that receives a rivet, bolt or screw that passes through an opening formed in the center of the pinch shield 70.

In addition, to the central portion 72, the steering mechanism mount 74 features downward extending leg portions 76a and 76b. The end portions of a cross member 82 are secured to the bottom ends of the steering mechanism mount legs 76a and 76b. The cross member 82 features a generally inverted U-shape and features a horizontal central portion 84. The central portion of lower tongue 55 is pivotally attached via a fastener such as a nut and bolt, screw or rivet to the underside of the horizontal central portion 84 of the cross member 82

Figure 4:
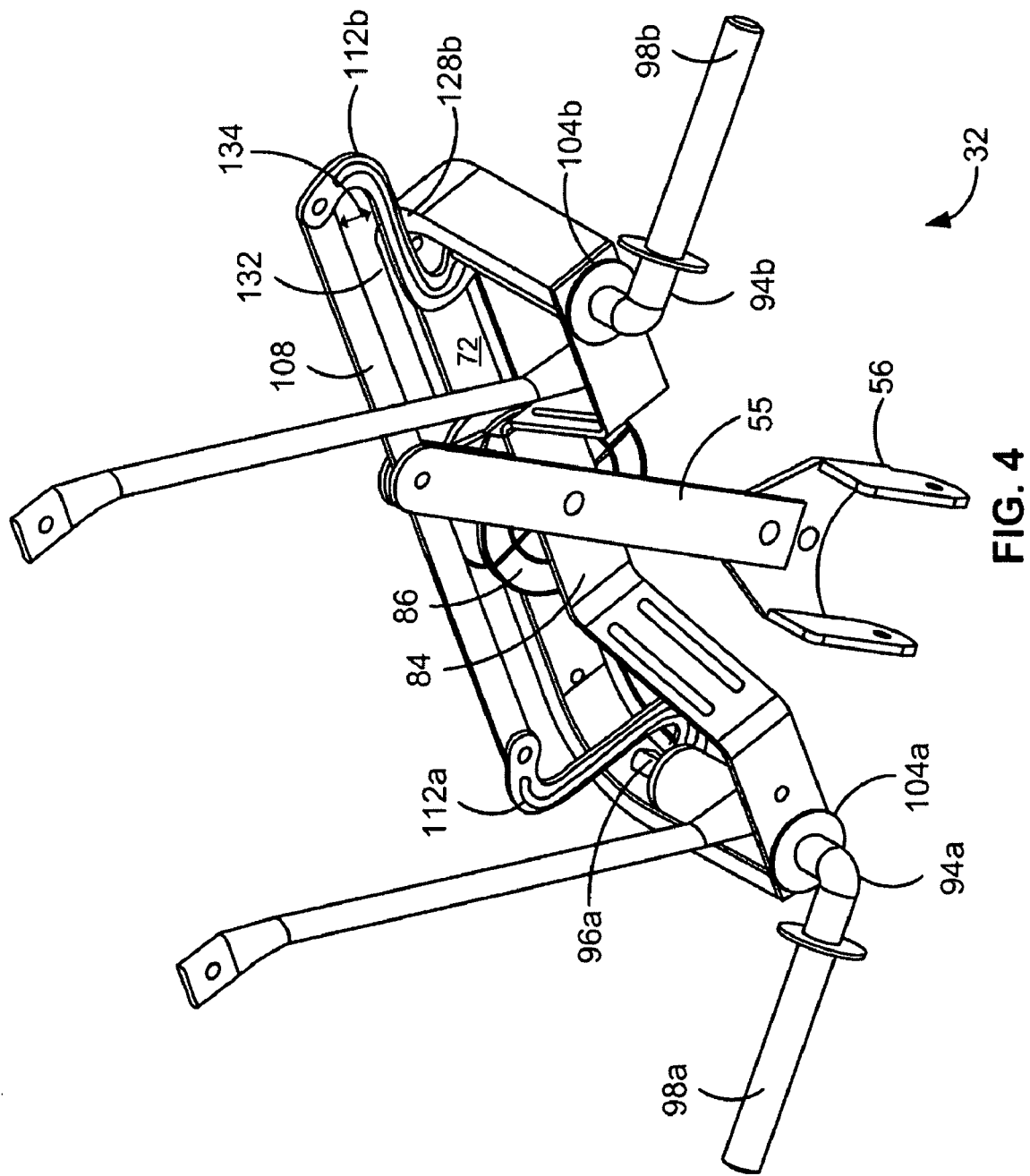
FIG. 4 is a bottom perspective view of the steering mechanism of FIG. 3C.

(see also FIG. 4). A disk-shaped pinch shield 86 is mounted to the top side of the horizontal central portion of the cross member.

Support braces 90a and 90b are also attached by their lower ends to the cross member 82. The upper ends of the support braces are secured to the underside of the wagon floor (36 in FIG. 2). The connections may be made by rivets, nuts and bolts, welds or other fastening arrangements known in the art.

As illustrated in FIG. 3A, a pair of cylindrical bearings 92a and 92b are mounted one each to the interior-facing surfaces of the leg portions 76a and 76b of the steering mechanism mount. These bearings pivotally support the vertical portions of L-shaped axle spindles, indicated in general at 94a and 94b. The top end of each axle spindle vertical portion is provided with a squared fitting, illustrated for spindle 94b at 96b in FIG. 3A and at 96a in FIG. 4 for spindle 94a. Each axle spindle also features a horizontal portion illustrated at 98a and 98b. As illustrated in FIG. 6, each horizontal portion receives a front wheel of the wagon. As illustrated in FIGS. 3A-4, each axle spindle is also provided with upper washers 102a and 102b and lower washers 104a and 104b which engage annular grooves formed in the vertical portions of the axle spindle so that each is secured within its respective bearing. The horizontal portions 98a and 98b are provided with flanges 106a and 106b to limit inward travel of the wagon front wheels mounted thereon. The wagon front wheels may be secured on the horizontal portions 98a and 98b by pressure-fit axle caps, illustrated at 107a and 107b in FIG. 2.

The trailing ends of the upper and lower tongues are pivotally connected to the central portion of a tie rod 108 by a fastener (which may be a bolt, screw, rivet or the like). The ends of generally S-shaped torque arms 112a and 112b are pivotally connected one each to the opposing ends of the tie rod 108. The other ends of the S-shaped torque arms feature square openings which engage the squared fittings 96a (FIG. 4) and 96b (FIG. 3A) of the axle spindles.

All of the components of the steering mechanism described above are preferably constructed from steel. Other high-strength and rigid materials may alternatively be used.

The steering mechanism 32 features the configuration of FIGS. 2 and 3A when the wagon is being steered straight forward or backward by handle 42.

Figure 3B:
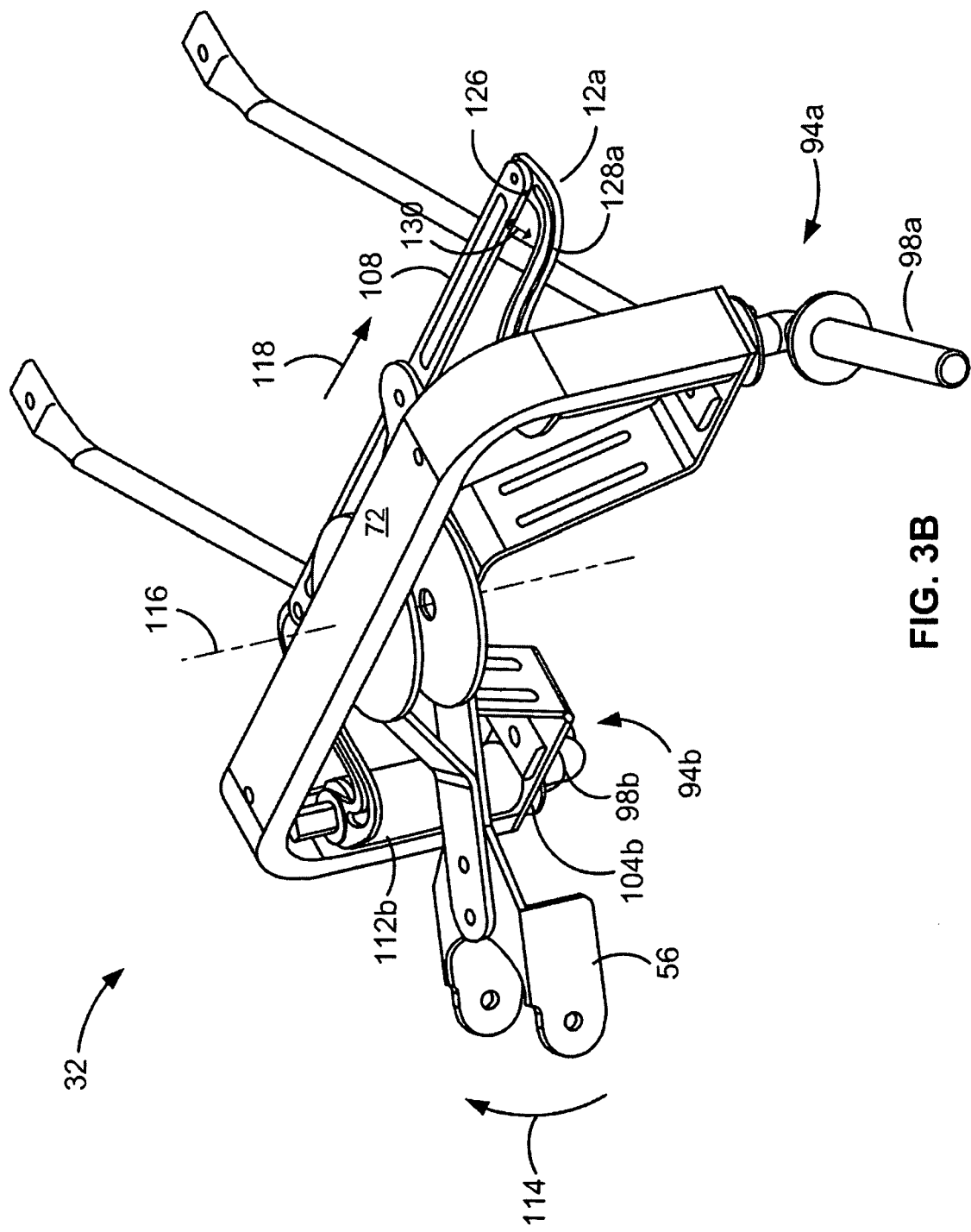

When the wagon is steered in a maximum (sharpest) right turn by the wagon handle, the steering mechanism is configured as illustrated in FIG. 3B. More specifically, with reference to FIG. 3B, when the clevis 56 is moved in the direction of arrow 114 (via the handle 42 of FIG. 2), the tongue assembly pivots clockwise about axis 116 (illustrated in phantom) so that the trailing end of the tongue assembly, and thus tie rod 108, moves in the direction of arrow 118. The movement of tie rod 108 causes torque arms 112a and 112b to pivot clockwise about the vertical portions of axle spindles 94a and 94b. As a result, the horizontal portions of the axle spindles 98a and 98b, and thus the wagon front wheels, also pivot clockwise about the vertical portions of axle spindles 94a and 94b so that the wagon turns.

Figure 3C:
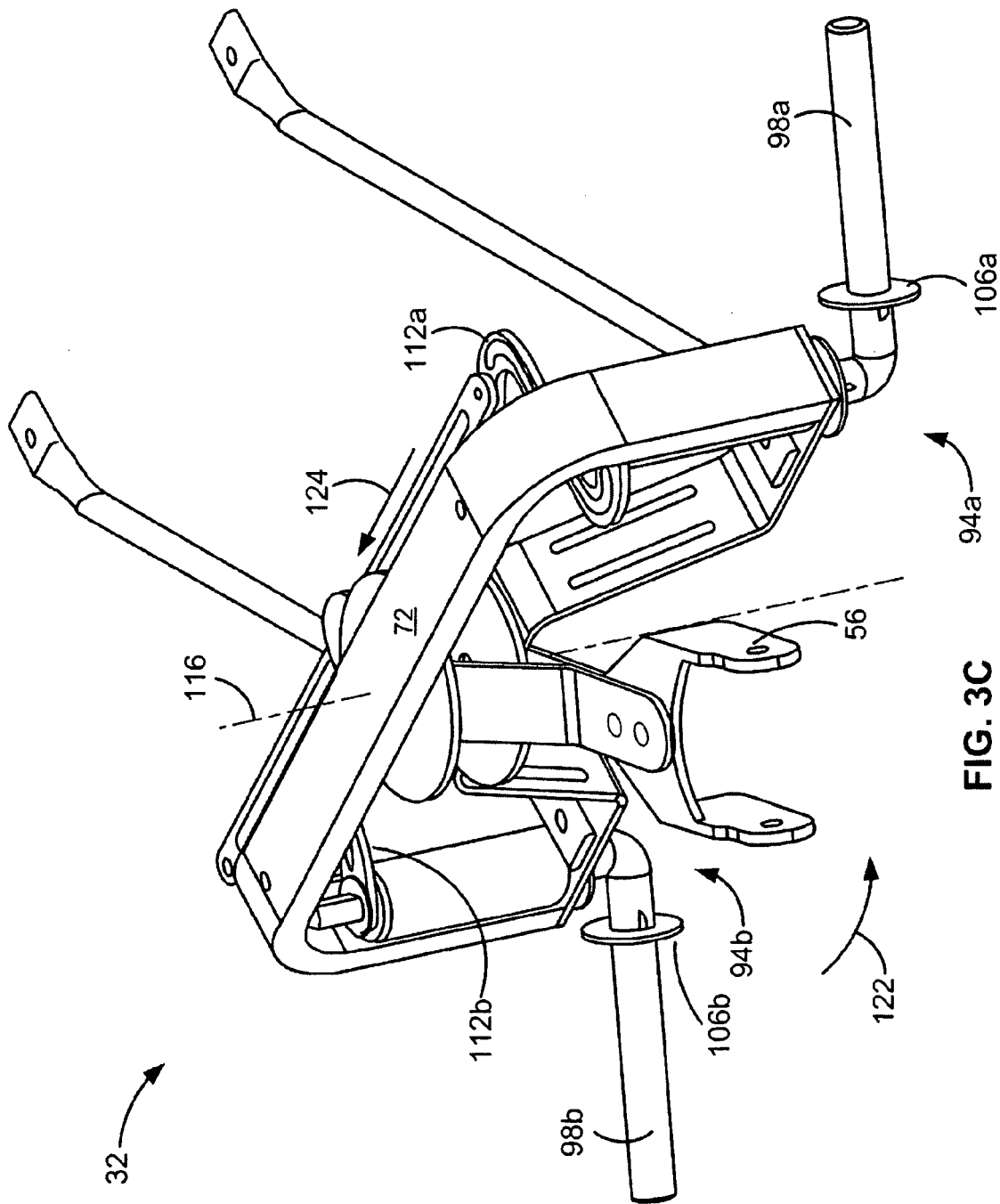

When the wagon is steered in a maximum (sharpest) left turn by the wagon handle, the steering mechanism is configured as illustrated in FIGS. 3C and 4. More specifically, as is apparent from the above paragraph, the tongue assembly pivots counterclockwise about axis 116 (FIG. 3C) when the clevis 56 is moved in the direction of arrow 122 (via the handle 42 of FIG. 2) so that tie rod 108 moves in the direction of arrow 124. This causes the torque arms 112a and 112b to pivot counterclockwise about the vertical portions of axle spindles 94a and 94b. As a result, the horizontal portions of the axle spindles 98a and 98b, and thus the wagon front wheels, also pivot counterclockwise about the vertical portions of axle spindles 94a and 94b so that the wagon turns.

As illustrated by FIGS. 3B, 3C and 4, the shape of the torque arms 112a and 112b prevent the occurrence of "scissor" actions and thus pinch points between the tie rod 108 and the torque arms 112a and 112b when the wagon is steered in a sharp right or left turn. More specifically, with reference to FIG. 3B, the generally S-shaped torque arm 112a causes a space 126 to be formed between the torque arm 112a and the tie rod 108. The space 126 is sized so that the distance between the central portion 128a of the torque arm 112a and the tie rod 108, indicated at 130 in FIG. 3B, is at least approximately 12.0 mm. Similarly, with reference to FIG. 4, the generally S-shaped torque arm 112b causes a space 132 to be formed between the torque arm 112b and the tie rod 108. The space 132 is sized so that the distance between the central portion 128b of the torque arm 112b and the tie rod 108, indicated at 134 in FIG. 4, is at least approximately 12.0 mm. This prevents children's fingers from being pinched in the steering mechanism.

Figure 5A:
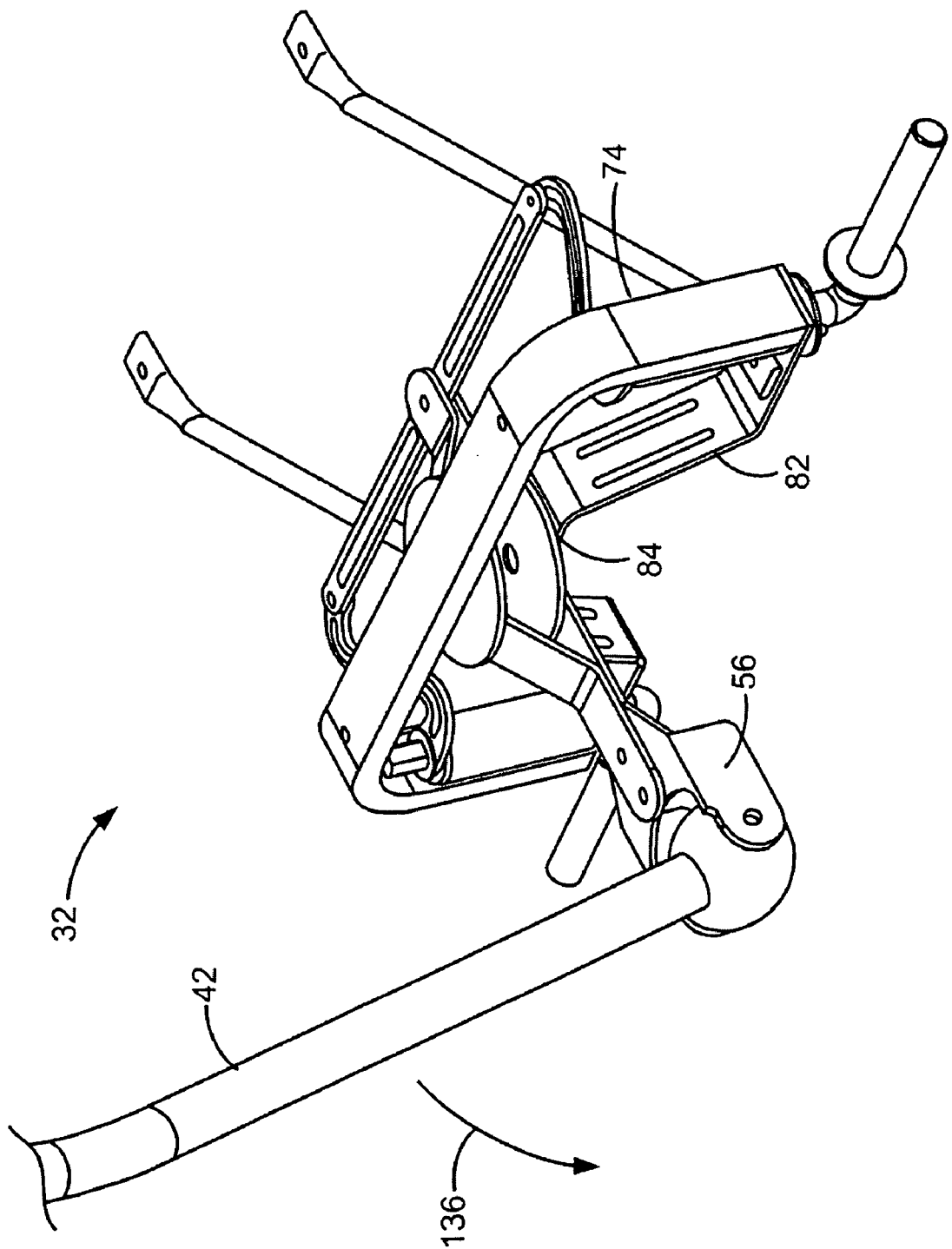
FIGS. 5A and 5B show steering mechanism of FIGS. 2-4 with the handle in a use position and a storage position, respectively.
Figure 5B:
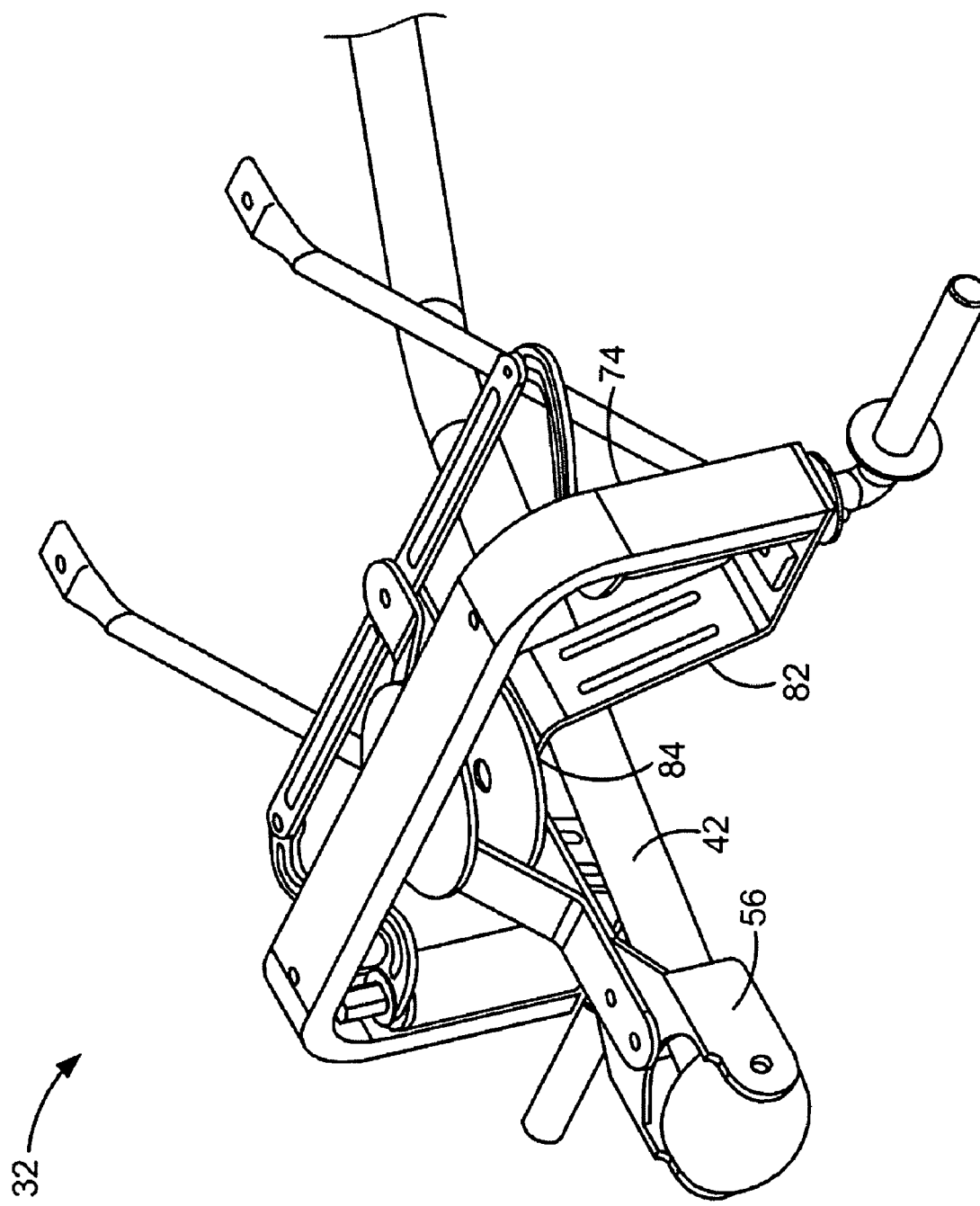

FIGS. 5A, 5B and 6 illustrate a further benefit of the steering mechanism 32 of FIGS. 1-4. More specifically, the wagon handle 42 may pivot from a use position, such as the one illustrated in FIG. 5A, in the direction of arrow 136 to the storage position illustrated in FIGS. 5B and 6, where the handle is positioned beneath the wagon body 34 (FIG. 6). The generally inverted U-shape of cross member 82 permits the handle to pass under the horizontal central portion 84 to a position adjacent to the wagon body. This permits the wagon to assume a compact configuration for ease of loading, transport and/or storage.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A vehicle comprising:
   a) a body,
   b) a cross member attached to the body;
   c) a tongue assembly featuring a leading portion, a central portion and a trailing portion, the central portion of said tongue assembly pivotably connected to the cross member;
   d) a handle pivotally attached to the leading portion of the tongue assembly;
   e) a tie rod pivotally attached to the trailing portion of the tongue assembly;
   f) a pair of axle spindles pivotally attached one each to opposite ends of the cross member;
   g) a mount which shields a vertical portion of the spindles and is connected to the cross member and the vehicle;
   h) a pair of wheels rotatably mounted one each on the pair of axle spindles; and
   i) a pair of generally S-shaped torque arms connected one each to the axle spindles and pivotally connected one each to opposite ends of the tie rod.

2. The vehicle of claim 1 wherein the tongue assembly includes a lower tongue and an upper tongue that are connected together by their leading portions and trailing portions, said upper tongue pivotally connected to the mount and said lower tongue pivotally connected to the cross member.

3. The vehicle of claim 2 further comprising a disk-shaped pinch shield attached to the cross member at a pivotal connection between the lower tongue and the cross member.

4. The vehicle of claim 2 further comprising a disk-shaped pinch shield attached to the upper tongue, said disk-shaped pinch shield pivotally connected to the mount.

5. The vehicle of claim 1 further comprising a clevis attached to the leading portion of the tongue assembly and pivotally attached to said handle.

6. The vehicle of claim 1 further comprising a pair of bearings positioned one each at opposite ends of the cross member; and
   wherein the pair of axle spindles are generally L-shaped and each includes a generally vertical portion and a generally horizontal portion, with the vertical portions pivotally received one each by the pair of bearings and the pair of wheels rotatably mounted one each on the horizontal portions.

7. The vehicle of claim 6 wherein each vertical portion of the pair of axle spindles features a squared fitting that is engaged by one of the pair of generally S-shaped torque arms.

8. The vehicle of claim 1 wherein the pair of generally S-shaped torque arms each includes a central portion, each of said pair of generally S-shaped torque arms sized and shaped so that a distance between the central portion of each torque arm and the tie rod is never less than approximately 12 mm.

9. The vehicle of claim 1 wherein the cross member features a generally inverted U-shape so that said handle may be pivoted into a storage position under the wagon body.

10. The vehicle of claim 9 wherein the body is a wagon body and the cross member is mounted to an underside of the floor.

11. A steering mechanism for a children's vehicle comprising:
    a) a cross member adapted to be attached to the children's vehicle;
    b) a tongue assembly featuring a leading portion, a central portion and a trailing portion, the central portion of said tongue assembly pivotably connected to the cross member;
    c) a handle pivotally attached to the leading portion of the tongue assembly;
    d) a tie rod pivotally attached to the trailing portion of the tongue assembly;
    e) a pair of axle spindles pivotally attached one each to opposite ends of the cross member;
    f) a mount which shields a vertical portion of the spindles and is connected to the cross member and adapted to be attached to the children's vehicle;
    g) a pair of wheels rotatably mounted one each on the pair of axle spindles; and
    h) a pair of generally S-shaped torque arms connected one each to the axle spindles and pivotally connected one each to opposite ends of the tie rod.

12. The steering mechanism of claim 11 wherein the tongue assembly includes a lower tongue and an upper tongue that are connected together by their leading portions and trailing portions, said upper tongue pivotally connected to the mount and said lower tongue pivotally connected to the cross member.

13. The steering mechanism of claim 12 further comprising a disk-shaped pinch shield attached to the cross member at a pivotal connection between the lower tongue and the cross member.

14. The steering mechanism of claim 12 further comprising a disk-shaped pinch shield attached to the upper tongue, said disk-shaped pinch shield pivotally connected to the mount.

15. The steering mechanism of claim 11 further comprising a clevis attached to the leading portion of the tongue assembly and pivotally attached to said handle.

16. The steering mechanism of claim 11 further comprising a pair of bearings positioned one each at opposite ends of the cross member; and
    wherein the pair of axle spindles are generally L-shaped and each includes a generally vertical portion and a generally horizontal portion, with the vertical portions pivotally received one each by the pair of bearings and the pair of wheels rotatably mounted one each on the horizontal portions.

17. The steering mechanism of claim 11 wherein the pair of generally S-shaped torque arms each includes a central portion, each of said pair of generally S-shaped torque arms sized and shaped so that a distance between the central portion of each torque arm and the tie rod is never less than approximately 12.0 mm.

18. The steering mechanism of claim 11 wherein the cross member features a generally inverted U-shape so that said handle may be pivoted into a storage position under the vehicle.

* * * * *